US012794860B2

(12) United States Patent
Nalavade et al.

(10) Patent No.: US 12,794,860 B2
(45) Date of Patent: Nov. 10, 2026

(54) SYSTEMS AND METHODS FOR ESTABLISHING A SECURE STORAGE ENVIRONMENT TO REDUCE DATA INTERCEPTION DURING CYBERATTACKS TARGETING UNSECURED ENVIRONMENTS

(71) Applicant: Capital One Services, LLC, McLean, VA (US)

(72) Inventors: Satyajit Sajanrao Nalavade, Mckinney, TX (US); Karthik Srinivasan, Frisco, TX (US); Yeng Yang, Oldsmar, FL (US); Antonio Garrido, Mckinney, TX (US); Dustin Ryan Nation, The Colony, TX (US); Shiv Somashekhar, Allen, TX (US); Vikramaditya Repaka, Frisco, TX (US); Christopher Nicotra, Holiday, FL (US); Kamlesh Talreja, Bellevue, WA (US)

(73) Assignee: Capital One Services, LLC, McLean, VA (US)

( * ) Notice: Subject to any disclaimer, the term of this patent is extended or adjusted under 35 U.S.C. 154(b) by 98 days.

(21) Appl. No.: 19/037,054

(22) Filed: Jan. 24, 2025

(65) Prior Publication Data

US 2026/0142948 A1 May 21, 2026

Related U.S. Application Data

(60) Provisional application No. 63/723,025, filed on Nov. 20, 2024.

(51) Int. Cl.
*H04L 9/40* (2022.01)
*H04L 41/22* (2022.01)
*H04L 67/1097* (2022.01)

(52) U.S. Cl.
CPC .......... *H04L 63/0414* (2013.01); *H04L 41/22* (2013.01); *H04L 63/20* (2013.01); *H04L 67/1097* (2013.01)

(58) Field of Classification Search
None
See application file for complete search history.

(56) References Cited

U.S. PATENT DOCUMENTS 10,810,563 B1 * 10/2020 Davison ................. G06Q 20/12
2013/0340028 A1 * 12/2013 Rajagopal ............ G06F 21/316
726/1

(Continued)

*Primary Examiner* — Sanchit K Sarker
(74) *Attorney, Agent, or Firm* — Foley & Lardner LLP

(57) ABSTRACT

Systems and method for establishing a secure storage environment to reduce data interception during cyberattacks targeting unsecured environments are disclosed. For example, a system can be configured to obtain, in accordance with a browsing context, user input indicating a request to display a user interface (UI) for a webpage hosted by a first data source that is unsecured. The system can obtain webpage data from the first data source and determine a unique identifier for a secured web element that identifies a second data source different from the first data source. In response to determining the unique identifier for the secured web element, the system can execute operations to establish a secured storage environment that is segmented from one or more other storage environments maintained by the webpage and provide at least a portion of the data in the secured storage environment to the second data source.

19 Claims, 6 Drawing Sheets

400

(56) References Cited

U.S. PATENT DOCUMENTS

| | | | | |
|---|---|---|---|---|
| 2016/0277421 | A1* | 9/2016 | Lahoz | G06Q 20/3821 |
| 2018/0224981 | A1* | 8/2018 | Hey | G06F 11/3672 |
| 2019/0116037 | A1* | 4/2019 | Donaldson | H04L 9/14 |
| 2020/0193042 | A1* | 6/2020 | Johns | G06F 16/986 |

* cited by examiner

200A

200B

200C

400

SYSTEMS AND METHODS FOR ESTABLISHING A SECURE STORAGE ENVIRONMENT TO REDUCE DATA INTERCEPTION DURING CYBERATTACKS TARGETING UNSECURED ENVIRONMENTS

CROSS-REFERENCE TO RELATED APPLICATION(S)

This application claims the benefit of priority of U.S. Provisional Application No. 63/723,025, filed Nov. 20, 2024. The contents of the foregoing application are incorporated herein in its entirety by reference.

BACKGROUND

A client device can request web browser data from a web server (e.g., acting as a host for a website) and subsequently establish communication connections with multiple web servers corresponding to the configured web elements (sometimes referred to as "widgets"). However, conventional processes for embedding, activating, and customizing these web elements for downstream execution by the client device are often inefficient, requiring complex scripts to be configured and maintained at the web server hosting the website and, in many cases, manual intervention by developers when issues arise or when the web element(s) need to be reconfigured. Further, when communication connections are established that involve multiple web elements and corresponding web servers, it can be difficult to efficiently manage and secure the data stored at the client device.

As a result of these difficulties, web elements implemented by various client devices can be subject to cybersecurity challenges due to inherent variability in security implementations among platforms. For example, different device configurations can lead to inconsistent operation of these web elements. Similarly, different applications of security measures across devices can result in inconsistent management of resources, including local memory, with some devices allowing for greater access to these resources between web elements than desired. This, in turn, can allow for inconsistent web element performance when generating graphical user interfaces (GUIs) for these web elements at the client device. Additionally, client devices can be subject to cross-site memory attacks where malicious code from one web element attempts to access, read, or manipulate data or memory allocated to another web element within the same browser session, typically by circumventing the same-origin policy or exploiting vulnerabilities in browser security mechanisms.

SUMMARY

In view of these challenges, systems and methods are described herein relating to novel uses and/or improvements in configuring web elements (e.g., "widgets") during sessions and establishing secure storage environments to, among other things, reduce the likelihood that data can be intercepted during cyberattacks. More specifically, described are novel techniques for configuring web elements executed by a client device to communicate with different data sources (e.g., a server hosting a webpage and one or more different servers associated with portions of that webpage) and maintain data in memory at the client device during such communication. By configuring these web elements to communicate with these different data sources and establish secure memory locations on the client device several benefits are established. First, data privacy can be enhanced by isolating sensitive information from other, non-sensitive information, reducing the risk of data leaks or unauthorized access being obtained by other web elements that could otherwise read from these memory locations. Secure memory also improves performance of the devices involved by reducing the need for redundant data requests when communicating with a common data source across multiple websites, as web elements can share cached information efficiently with the data source across multiple sessions. This setup also supports synchronous data handling, allowing for real-time updates and interactions between different parts of an application. Additionally, it provides a framework for consistent security policies, where access controls and encryption can be uniformly applied to protect data in transit and at rest. This centralization can also facilitate easier state management for complex web applications, ensuring that data integrity and coherence are maintained across multiple server interactions, enhancing both the security and the user experience at the client device.

In some aspects, systems and methods for establishing a secure storage environment to reduce data interception during cyberattacks targeting unsecured environments are described. For example, a system can determine a unique identifier for a web element of plurality of web elements of a webpage. The webpage can be hosted by a first data source that identifies a second data source maintaining data associated with the web element. In some examples, in response to determining the unique identifier for the web element, the system can execute one or more operations to establish a storage environment that is segmented from one or more other storage environments maintained at a client device for the webpage. The system can then cause a user interface (UI) to be generated by a display device of the client device, the UI including a representation of the web element. In examples, in response to receiving user input at the client device in accordance with the web element, the system can generate application data associated with one or more network operations that is maintained in the storage environment (e.g., the secured storage environment). And in response to generating the application data, the system can provide at least a portion of the application data to the second data source. This can be done via a secured communication connection between the system and the second data source.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention can be practiced without these specific details or with an equivalent arrangement. In other cases, well-known structures and devices are shown in block diagram form in order to avoid unnecessarily obscuring the embodiments of the invention.

Some of the systems and methods described herein can be configured to use unique identifiers for each website managed by an organization and a custom loader script to dynamically load and configure web elements for organization-specific contexts, reducing manual efforts and ensuring seamless integration without disrupting the organization's website's core functionality. These web elements can be delivered using inline frames or modal windows, ensuring consistency and independent operation from the main website structure. In some embodiments, the architectures described herein can efficiently manage the data flow between the user interface of the web elements and backend services while maintaining session continuity across the interactions. The systems and methods described herein can also support centralized session management, web element performance monitoring, and integration with analytics services to track user inputs across various sessions.

Figure 1:
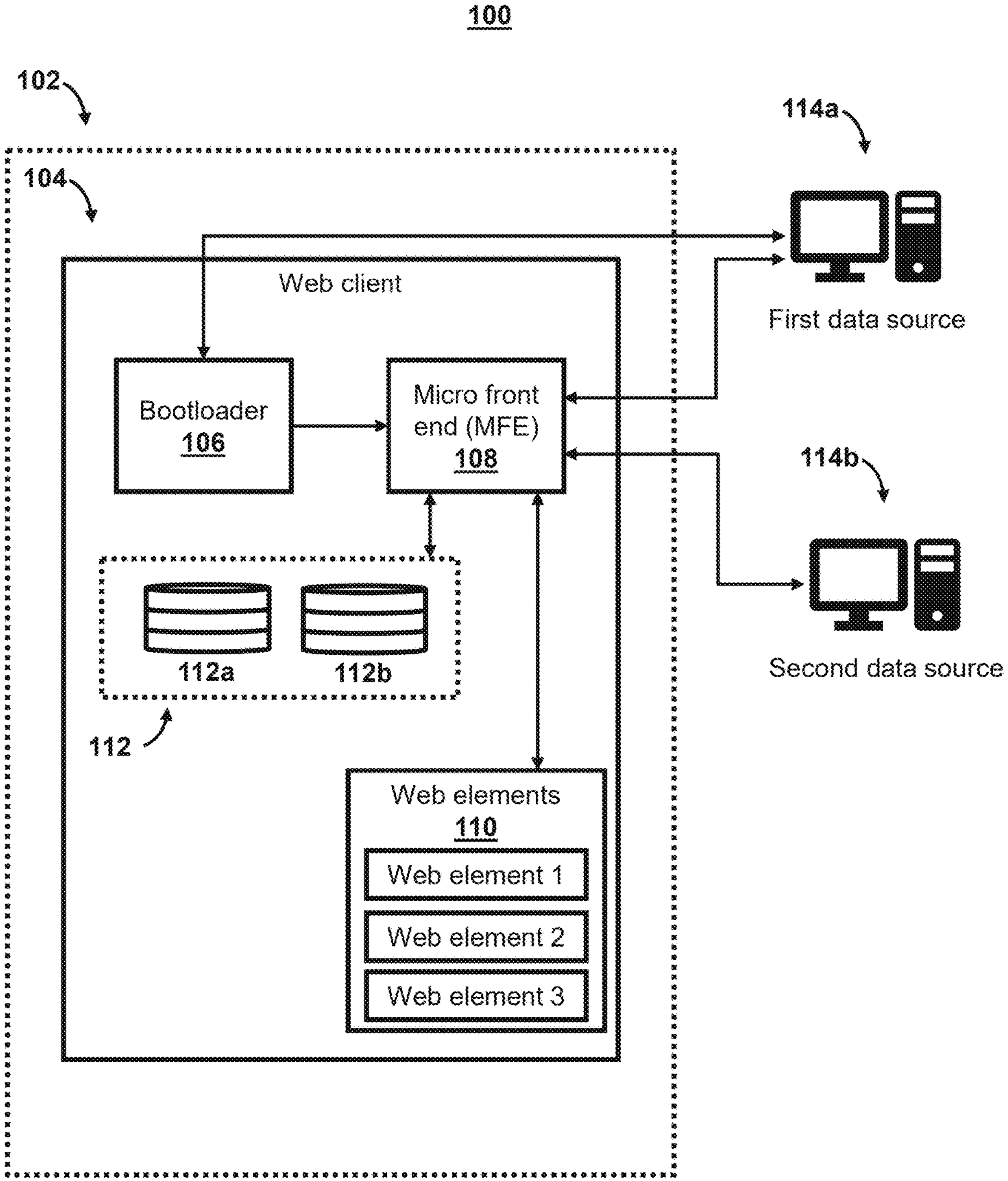
FIG. 1 shows an illustrative diagram for establishing a secure storage environment to reduce data interception during cyberattacks targeting unsecured environments, in accordance with one or more embodiments.

FIG. 1 shows a diagram of an environment 100 that can be configured to, among other things, establish a secure storage environment to reduce data interception during cyberattacks targeting unsecured environments, in accordance with one or more embodiments. For example, the environment 100 can include a client device 102 having one or more components as described herein, a first data source 114*a*, and a second data source 114*b*. The client device 102 (e.g., one or more components of the client device 102), the first data source 114*a*, and/or the second data source 114*b* can be configured to interconnect using one or more wired and/or wireless connections. As will be understood, the environment 100 includes a client device 102 and a first data source 114*a* and second data source 114*b*, but similar environments can include more client devices and/or data sources that are the same as, or similar to, the client device 102 and/or the first data source 114*a* or the second data source 114*b*.

In some embodiments, the client device 102 can include a computing device that is configured to be in communication with the first data source 114*a* and/or the second data source 114*b* using one or more communication paths (also referred to as communication connections) as described herein. For example, the client device 102 can include a desktop computer, a laptop computer, a smartphone, a tablet, and/or the like. In some embodiments, the client device 102 can include (e.g., implement) a web client 104 that is associated with a bootloader 106, a micro frontend (MFE) 108, web elements 110, and a database 112. The database 112 can include a first storage environment 112*a* and a second storage environment 112*b* (also referred to herein as a "secured storage environment"). While certain components are illustrated by FIG. 1, the client device 102 can include and/or exclude one or more of the illustrated components. The client device 102 can also include one or more components that are the same as, or similar to, the user terminal 324 of FIG. 3. As described herein, the client device 102 (e.g., one or more components of the client device 102) can establish one or more secured or unsecured communication connections with the first data source 114*a* and/or the second data source 114*b*.

The first data source 114*a* and the second data source 114*b* can include, or be formed by, one or more computing devices that coordinate execution of one or more operations. For example, the first data source 114*a* and the second data source 114*b* can include one or more desktop computers, laptop computers, point-of-sale devices, etc. While illustrated as being independent devices, it will be understood that the first data source 114*a* and the second data source 114*b* can be configured to communicate with one another. Additionally, or alternatively, the first data source 114*a* and the second data source 114*b* can be implemented by a single computing device or within a distributed computing system as separate systems.

In some embodiments, the first data source 114*a* can be associated with a website service provider. For example, the first data source 114*a* can be associated with a website service provider that is involved in providing computing and/or software resources associated with web operations, encompassing hosting options such as shared, dedicated, and/or virtual private servers (VPSs), and cloud environments; domain registration for establishing digital identity; website configuration systems or content management system (CMS) platforms for site construction; integration with e-commerce frameworks for online transactions; secured sockets layer (SSL)/transport layer security (TLS) encryption and other security protocols to protect data integrity; ongoing site maintenance, updates, and technical support; web analytics for performance tracking.

In some embodiments, the second data source 114*b* can be associated with a payment service provider (PSP) or any similar entity that facilitates pre-approval of electronic payment transactions for businesses or individuals. For example, the second data source 114*b* can be configured to establish communication connections with one or more client devices that are the same as, or similar to, the client device 102 to process requests involving loan pre-approvals. In some examples, the second data source 114*b* can include an integrated software platform to facilitate the loan pre-approval process. In these examples, the second data source 114*b* can implement (e.g., execute) algorithms to communicate through a secured communication connection when determining an amount for which a user interacting with the client device 102 is, or is likely to be, pre-approved for. To prevent the loss of personal and/or private information, the second data source 114*b* can be configured to cause a corresponding web element of the web elements 110 implemented by the web client 104 of the client device 102 to maintain data in a secured storage environment of the database 112 as described herein. The second data source 114*b* can then generate data that is provided to the client device 102 to allow one or more corresponding web elements to display information. For example, the second data source 114*b* can generate GUI data that is used by the client device 102 to generate a GUI to display a webpage that is based on operations performed by the web elements as described herein.

The components of the client device 102 can be implemented as individual devices or can be collectively implemented by a single device or group of devices. For example, the MFE 108 can include one or more devices configured to be in communication with the first data source 114*a* and/or the second data source 114*b*. As described here, the MFE 108 can also be configured to be in communication with the database 112, including the first storage environment 112*a* and/or the second storage environment 112*b*. As described herein, the first storage environment 112*a* and/or the second storage environment 112*b* can be associated with (e.g., correspond to) the first data source 114*a* and the second data source 114*b*, respectively, and the MFE 108 can manage communication connections established therebetween.

The web client 104 can include one or more devices, modules, and/or the like that can be configured to be in communication with the first data source 114*a* and/or the second data source 114*b*. For example, the web client 104 can include a system such as a bootloader 106 that is configured to initially receive a Hypertext Markup Language (HTML) file including a text document with markup codes that identifies the structure and content of a webpage hosted by the first data source 114*a*. In some embodiments, the bootloader 106 can configure the web client 104 to interpret the HTML file and display text, images, links, and other elements in accordance with the HTML file. For example, the bootloader 106 can be configured to obtain the HTML file (e.g., in response to input at the client device 102 from a user to navigate to a webpage) and configure the MFE 108 to perform one or more operations during one or more browsing sessions (also referred to as "sessions"). Once configured, the MFE 108 can configure the web elements 110 and the database 112 such that data maintained in the database 112 (e.g., in the first storage environment 112*a* or the second storage environment 112*b*) is displayed on a display device of the client device 102 using one or more inline frames (iframes) or modal windows. The MFE 108 can also establish secured or unsecured communication connections between one or more components of the web client 104 and the first data source 114*a* and/or the second data source 114*b* to allow for communication of data between the various storage environments in the database 112 and the first data source 114*a* and/or the second data source 114*b*.

In some embodiments, the HTML file can be generated and/or stored at the first data source 114*a* by one or more organizations to establish secured web elements and/or secured storage environments upon execution at the client device 102 as described herein. These organizations can include organizations that establish secured web elements and/or secured storage to allow for communication of sensitive and/or personal/private information, including service providers and/or payment processing networks (e.g., involved in processing payment transactions initiated and involving the client device 102, etc.).

In some embodiments, the devices of the environment 100 can be configured to establish direct or indirect communication connections between one another. For example, one or more networks can establish communication paths between one or more of the devices of the environment 100 to allow for the communication of messages (e.g., network packets, etc.) therebetween. In this example, the communication paths can be the same as, or similar to, the communication paths 328, 330, and 332 of FIG. 3. The network(s) can include mobile phone networks, mobile voice or data networks, cable networks, public switched telephone networks, the Internet, or other types of communications networks or combinations of communications networks as described herein.

It will be understood that the number and arrangement of devices in the environment 100 are provided as an example and that there can be differently arranged environments than those shown in FIG. 1. In some embodiments, at least some of the device(s) and/or system(s) of FIG. 1 can be implemented by a single device or multiple devices within a distributed system. For example, the client device 102 can be implemented by a single device or as multiple devices that, either alone or in coordination, perform one or more of the operations as described herein.

With continued reference to FIG. 1, one or more of the components of the environment 100 can be configured to initialize and update web elements (e.g., widgets) during one or more sessions and establish secure storage environments to, among other things, reduce the likelihood that data can be intercepted during cyberattacks. For example, a user can first provide input to the client device 102 (e.g., using an input device such as a keyboard, a mouse, a touchscreen, and/or the like not expressly shown in FIG. 1). The input can represent a request to display a user interface (UI) (e.g., a graphical user interface (GUI) and/or the like) in accordance with a browsing context. In this example, the input can be configured to cause the client device 102 to navigate to a webpage hosted by the first data source 114*a* and obtain webpage data from the first data source 114*a* that is associated with (e.g., describes how to display) the webpage. In response to receiving the input, the client device 102 can then initialize and provide the input to the web client 104. The browser can then cause the bootloader 106 to perform a DNS resolution, where the web client 104 translates the domain name into an IP address. The web client 104 can also establish a TCP connection to the first data source 114*a* and send an HTTP GET request for the desired resource (e.g., the webpage data for the webpage identified by the input). Upon receiving the HTTP response, which can include status codes, headers, and content (HTML, CSS, JavaScript), the web client 104 can parse the HTML to build the Document Object Model (DOM) and cause the bootloader 106 to configure the MFE 108.

In some embodiments, the browser can be configured to obtain webpage data that indicates a plurality of web elements to be displayed on a UI. Each web element can be further associated with a unique identifier, such as an ID attribute and/or the like that identifies one or more data sources, including the first data source 114*a* and/or the second data source 114*b*. The web client 104 can then provide at least a portion of the webpage data to the bootloader 106 to cause the bootloader 106 to configure the MFE 108. For example, the bootloader 106 can configure the MFE 108 (by executing one or more scripts, etc.) to further configure the web elements 110 and/or the database 112 associated with the web client 104 in accordance with instructions included in the webpage data. In this example, the MFE 108 can further configure the web elements 110 based on the unique identifier associated with each web element of the web elements 110.

In some embodiments, the web elements 110 can each be assigned unique identifiers based on the webpage data. In one example, a first unique identifier can indicate the webpage hosted by the first data source 114*a*. In examples, a second unique identifier can indicate the second data source 114*b* that is to be associated with a web element dedicated to the second data source 114*b*. It will be understood that, where multiple web elements are associated with multiple data sources (e.g., a third data source, etc., not explicitly shown), additional unique identifiers can be assigned to respective web elements of the web elements 110. In some embodiments, the MFE 108 can then configure the web element dedicated to the second data source 114*b* to obtain web element data from the second data source 114*b* and store the web element data in the second storage environment 112*b*. This web element data can allow the web element dedicated to the second data source 114*b* to generate the portion of the UI assigned to the web element dedicated to the second data source 114*b*. For example, the MFE 108 can obtain the web element data for the web element dedicated to the second data source 114*b* and store the web element data in the second storage environment 112*b*. This web element data can then be used by the MFE 108 and/or the web client 104 when generating portions of a UI for the webpage that are assigned to the web element dedicated to the second data source 114*b*.

In some embodiments, as developers reconfigure the web element data maintained by the second data source 114*b* (e.g., through iterative updates, etc.), or as the interactions between the user and the second data source 114*b* cause changes to be made to the web element dedicated to the second data source 114*b* (e.g., as fields are filled and the values in those fields are maintained, etc.), the web element dedicated to the second data source 114*b* can update portions of the UI. For example, in a single session or across multiple sessions involving the second data source 114*b*, the web element dedicated to the second data source 114*b* can obtain the web element data, including the changes made over time and generate corresponding portions of the UI based on the web element data. In this way, users can reduce the amount of interactions involved in configuring the web element dedicated to the second data source 114*b* during each session, similarly reducing the need for unnecessary communication between the client device 102 and the second data source 114*b*. Further, the experience of the user interacting with the portion of the UI controlled by the web element dedicated to the second data source 114*b* can be improved as latencies in generating the UI are reduced as a result of the reduced communications between the client device 102, the first data source 114*a*, and the second data source 114*b*.

As interactions between the user and the second data source 114*b* are indexed (through generation of application data as described herein), the second data source 114*b* can generate updated web element data and provide the updated web element data to the MFE 108 to be stored in the second storage environment 112*b*. The web element dedicated to the second data source 114*b* can then obtain the web element data that was updated by the second data source 114*b* from the second storage environment 112*b* and generate updates to the portion of the UI controlled by the web element dedicated to the second data source 114*b*.

In some embodiments, the web elements 110 can include interactive components within the website that are displayed in accordance with inline frames and/or modal windows (also referred to as modals). For example, the web elements 110 can include a first web element that is displayed on a website (e.g., a car dealership website) to enhance the functionality of the website. The web elements 110 can be implemented using the MFE 108 and/or the web client 104. Examples of web elements include forms (e.g., for user input to use when preapproving a loan), media players (for video/audio content), sliders (for rotating images or promotions), media feeds (for dynamic content updates), countdown timers, and e-commerce tools (shopping carts, product galleries). The web elements 110 can be built with HTML, CSS, and JavaScript, allowing for modular development and independent deployment via one or more iframes and/or modal windows. By configuring the MFE 108 in accordance with the webpage data, the web client 104 of the client device 102 can be configured to integrate the web elements 110 seamlessly, promoting scalability and maintainability while delivering a consistent user experience across sessions.

In some embodiments, the MFE 108 can configure the database 112 to include a first storage environment 112*a* and a second storage environment 112*b*. For example, the MFE 108 can configure the database 112 (e.g., during a session initiated by the user controlling the client device 102) in accordance with the webpage data. In this example, the MFE 108 can configure the database 112 such that a portion of database 112 is assigned to a first storage environment 112*a* that stores webpage data involved in generating one or more UIs using a display device of the client device 102. The MFE 108 can then assign the first storage environment 112*a* to be used for access to the webpage data by the MFE 108 during execution of a web element that is involved in generating the webpage for the web client 104.

In some embodiments, the MFE 108 can configure the database 112 such that a portion of database 112 is assigned to the second storage environment 112*b* (e.g., the secured storage environment). For example, the MFE 108 can configure the database 112 such that a portion is reserved to maintain data provided by the second data source 114*b*. In this example, the MFE 108 can assign the second storage environment 112*b* to be accessed by a web element dedicated to the second data source 114*b* during interactions involving the client device 102 and the second data source 114*b*. In these examples, the second storage environment 112*b* can be segmented from the first storage environment 112*a* and/or any other storage environments such that access is limited by the MFE 108 to operations that involve the web element dedicated to the second data source 114*b*.

During a session, the MFE 108 can be configured to obtain and store data provided by the second data source 114*b* and/or based on input provided by the user to the client device 102 when interacting with the web element dedicated to the second data source 114*b*. For example, the MFE 108 can establish a communication connection (e.g., a secure communication connection) between the second data source 114*b* and the second storage environment 112*b*. The MFE 108 can then manage data generated using the web element dedicated to the second data source 114*b* (e.g., application data) and store the application data generated during the interactions in the second storage environment 112*b*. In one example where the web element dedicated to the second data source 114*b* includes an inline frame or a modal window that is included in the UI generated by the web client 104, the MFE 108 can obtain application data generated by the web client 104 during the interactions between the user and the inline frame or modal window and upload some and/or all of the application data generated to the second data source 114*b* using the secured communication connection. In this way, users can interact with the client device 102, and the web client 104 can facilitate secure communication of application data between the second storage environment 112*b* and the second data source 114*b* that is separate from the communication of other data (e.g., webpage data, etc.) between the first storage environment 112*a* and the first data source 114*a* (and/or other storage environments and/or data sources not explicitly illustrated in FIG. 1).

In some embodiments, the MFE 108 can encrypt at least a portion of the application data generated based on the interactions between the user and the web client 104. For example, as the user provides input that is used to generate the application data (e.g., indicative of information such as the user's name, address, account number(s), etc.), the MFE 108 can encrypt the application data before storing the application data in the second storage environment 112*b*. This encryption can be performed by the MFE 108 in accordance with one or more security protocols. For example, the MFE 108 can encrypt at least a portion of the application data in accordance with advanced encryption standards (AES) and/or the like that are established for the secure communication connection between the second storage environment 112*b* and the second data source 114*b*. The MFE 108 can then provide at least a portion of the application data to the second data source 114*b* based on (e.g., in response to) encrypting at least a portion of the application data.

In some embodiments, one or more operations can be executed by the client device 102 to cause a UI to be generated by a display device of the client device 102. For example, the MFE 108 can execute one or more operations that are involved in generating the UI based on (e.g., in accordance with) the webpage data. In some examples, the web client 104 can execute one or more operations (alone or in coordination with the MFE 108) to generate the UI based on the webpage data. In some embodiments, the MFE 108 and/or the web client 104 can coordinate with the web elements 110 to execute one or more operations to generate the UI. For example, the MFE 108 and/or the web client 104 can generate the UI to include a representation of the webpage associated with the webpage data and the web elements 110. In this example, the MFE 108 and/or the web client 104 can include a representation of the web elements 110 as identified by the webpage data, including the web element dedicated to the second data source 114*b*.

In some embodiments, the web elements 110 can each be associated with a respective portion of the UI. For example, the web element dedicated to the second data source 114*b* can be associated with a portion of the UI that is assigned to display content in accordance with the data obtained from the second data source 114*b*. In one example, the web element dedicated to the second data source 114*b* can be associated with a first portion of the UI and, in response to selection of that portion by the user controlling the client device 102, can be associated with a second portion of the UI (e.g., a larger and/or different portion of the UI). For example, in response to initial selection of the portion of the UI associated with the web element dedicated to the second data source 114*b*, the web client 104 can update the UI such that an inline frame or a modal window can be displayed and/or overlaid onto the UI.

In some embodiments, the client device 102 can receive user input that is directed to the portion of the UI associated with the web element dedicated to the second data source 114*b*. For example, where the web element dedicated to the second data source 114*b* causes an inline frame or a modal window to be displayed that allows for input to one or more fields (e.g., text fields identifying a name, date of birth, payment device identifier, etc.) and/or uploaded using the one or more fields (e.g., to upload text files, image files, PDFs, etc.), the web elements 110 can be configured to receive that input and generate the application data described herein. This application data can then be maintained (e.g., stored) in the second storage environment 112*b* assigned to the web element dedicated to the second data source 114*b*. In some examples, application data can then be provided to (e.g., uploaded to) the second data source 114*b*.

In some embodiments, where the input by the user controlling the client device 102 is involved in one or more network operations (e.g., pre-approval applications, payment transactions, etc.), the application data can be generated and/or updated to represent a state of the one or more network operations. For example, where the first data source 114*a* is hosting a website for a vehicle dealership and the web element dedicated to the second data source 114*b* is associated with a payment service provider, the user can provide input directed to the web element dedicated to the second data source 114*b* to initiate a pre-approval request when considering a purchase of a vehicle. The input can then be used by the web client 104, the MFE 108, and/or the web element dedicated to the second data source 114*b* to generate the application data. In this example, the application data can be stored in the second storage environment 112*b*, and one or more devices of the client device (e.g., the web client 104, the MFE 108, and/or the web element dedicated to the second data source 114*b*) can be configured to encrypt at least a portion of the application data that corresponds to one or more fields designated as including personal or private information. The MFE 108 can then provide at least a portion of the application data stored in the second storage environment 112*b* to the second data source 114*b* via the secured communication connection established therebetween. This application data can then be received by the second data source 114*b* to initiate and/or update a network operation (e.g., a pre-approval application, a payment transaction, etc.) that is being managed by the second data source 114*b*.

In some embodiments, the input by the user controlling the client device 102 can cause the web client 104 to iteratively update the application data maintained in the second storage environment 112*b*. For example, the user controlling the client device 102 can provide input directed to the portion of the UI associated with the web element dedicated to the second data source 114*b*. The user can then provide additional input to other portions of the UI (e.g., to other web elements of the web elements 110 and/or other portions of the webpage) that indicates selection of one or more portions of the website. As an example, when navigating a vehicle dealership website, the user can select one or more vehicles of interest and navigate to linked webpages. The web client 104 can then obtain webpage data that is associated with these linked webpages, where the webpage data again identifies the second data source as being associated with the web element dedicated to the second data source 114*b*. As the web client 104 loads the linked webpages based on the webpage data obtained from the first data source 114*a*, the MFE 108 can obtain data maintained in the second storage environment 112*b* by the web element dedicated to the second data source 114*b* and update the portion of the UI associated with the web element dedicated to the second data source 114*b* using the application data generated during a given session or previous sessions.

In some embodiments, the second data source 114*b* can obtain (e.g., receive) the application data from the second storage environment 112*b* (e.g., using the MFE 108) and initiate and/or update one or more network operations based on the application data. For example, where the application data is encrypted, the second data source 114*b* can decrypt the application data. The second data source 114*b* can then extract session information from the application, where the session information indicates the one or more inputs provided by the user to the client device 102 during the session using the first web element or one or more second web elements. This session information can include information about products or services that were displayed by the one or more second web elements and selected on the website by the user, information represented by the application data as a result of the input provided by the user, etc. The web client 104 can then cause the application data stored in the second data source 114*b* to be updated to include (e.g., identify) the selections made in accordance with the second web elements. In some examples, the second data source 114*b* can then determine an identifier associated with the first data source 114*a* based on the session information and provide at least a portion of the session information to the first data source 114*a*. For example, in the context of the user initiating a network operation involved in pre-approval for a purchase of a vehicle, the second data source 114*b* can extract session information indicating one or more vehicles that were identified on a website hosted by the first data source 114*a* based on input by the user (e.g., that the user selected or navigated to) and provide portions of the session data indicating the one or more vehicles and one or more identifiers associated with the client device 102 (e.g., the email address of the user, the IP address of the client device 102, etc.) to the first data source 114*a*. This can allow the first data source 114*a* to generate updated webpage data that is directed to the client device 102 in response to subsequent receipt of request(s) for webpage data from the first data source 114*a* by the client device 102.

In some embodiments, the user can provide input to the client device 102 representing a request to display a different user interface (UI) (e.g., a graphical user interface (GUI) and/or the like) in accordance with a second browsing context. In this example, the input can be configured to cause the client device 102 to navigate to a second webpage hosted by a third data source (e.g., that is the same as, or similar to, the first data source) and obtain second webpage data from the third data source that is associated with the second webpage. In response to receiving the input, the client device 102 can then initialize and provide the input to the web client 104. The web client 104 can then cause the bootloader 106 to perform similar operations to cause the bootloader 106 to configure the MFE 108 to generate a UI of the second webpage. In some embodiments, the second webpage can be displayed using a second instance of a web browser, a second tab in a single web browser, etc.

In some embodiments, where the third data source is unsecured (e.g., a communication connection between the MFE 108 and the third data source and/or the data maintained by the third data source itself is not secured), the MFE 108 can again cause a UI to be displayed, where a portion of the UI is assigned to the web element dedicated to the second data source 114*b* and data generated is stored in the second storage environment 112*b*. In this example, the MFE 108 can obtain web element data from the second data source 114*b* and/or from the second storage environment 112*b* and cause a portion of the UI (e.g., an inline frame, a modal window, etc.) to be displayed based on the web element data. As an example, where the third data source is hosting a website for a different vehicle dealership, the web client 104 can obtain and generate a UI using the second webpage data, where at least a portion of the UI includes the same web element dedicated to the second data source 114*b* as was used to generate the portion of the UI associated with the first webpage.

In some embodiments, the web client 104 can determine that a first session corresponding to the first browsing context in which a UI is generated is terminated. For example, in response to receiving input from the user controlling the client device 102, the web client can determine that a web browser and/or tab was closed by the user. In this example, the web client 104 can subsequently obtain user input (e.g., second user input), indicating a second request to display a second UI for the first webpage hosted by the first data source. The second webpage data can be obtained and used again to cause the bootloader 106 to configure the MFE 108 in accordance with a second browsing context and during a second session similar to the first session (described above). This can include obtaining second webpage data from the first data source 114*a*, indicating the web elements 110 to be displayed based on the second request. The MFE 108 can then coordinate with the web client 104 to cause a second UI to be generated by the display device of the client device based on the second webpage data. In this example, the second UI can include a representation of the web element dedicated to the second data source 114*b*. For example, the web client 104 can maintain the data stored in the first data source 114*a* and/or the second data source 114*b* after termination of the first session and, in response to determining that the second session involves at least the web element dedicated to the second data source 114*b*, display at least a portion of the second UI in accordance with the web element dedicated to the second data source 114*b*.

Similarly, the web client 104 can determine that a first session corresponding to the first browsing context in which a UI is generated is terminated and subsequently obtain user input (e.g., second user input), indicating a second request to display a second UI for a second webpage hosted by a third data source (e.g., that is the same as, or similar to, the first data source 114*a*). The second webpage data can be obtained and used again to cause the bootloader 106 to configure the MFE 108 in accordance with a second browsing context and during a second session similar to the first session (described above). This can include obtaining second webpage data from the third data source indicating the web elements 110 to be displayed based on the second request. The MFE 108 can then coordinate with the web client 104 to cause a second UI to be generated as described herein to display the webpage hosted by the third data source.

Certain techniques described herein involve a client device 102 that operates independent of other client devices. In some embodiments, multiple client devices can be controlled (e.g., by the same user). For example, a user can control a first client device (e.g., a mobile device such as a smartphone or tablet) and a second client device (e.g., a laptop computer). Each of the first client device and the second client device can include some and/or all of the components discussed with respect to the client device 102. In some embodiments, a first input can be received at the first client device to cause a browsing context (e.g., a first browsing context) to be displayed as described herein. A second user input can then be received at the second client device to cause a similar browsing context (e.g., a second browsing context) to be displayed. For example, a web client of the second client device can obtain second user input indicating a second request to display a second user interface for a second webpage at the same time, or a different time, as when the first client device obtains input indicating the first request. This second user input can be obtained in accordance with the second browsing context displayed at a second client device. The web client of the second client device can then determine a user identifier corresponding to the second user input based on the second request to display the second user interface. For example, the second user input can be associated with a user identifier (e.g., an email address, etc.) that corresponds to the first user input used by the first client device. The second client device can then obtain second webpage data from the first data source 114*a* or a third data source indicating a second plurality of web elements to be displayed based on the second request and the user identifier. In some embodiments, the MFE of the second client device can establish a secure communication connection with the second data source 114*b* as described herein and coordinate with the second data source 114*b* to determine that the user identifier is associated with application data that was provided to and maintained by the second data source 114*b* in response to user interactions involving the first client device. In this example, the MFE can then obtain the web element data and/or the application data maintained by the second data source 114*b* corresponding to the user identifier and update the data stored in the second storage environment of the second client device based on the application data maintained by the second data source 114*b* and cause a second UI to be generated by the display device of the second client device based on the second webpage data. In this way, the first data source 114*a* and the second data source 114*b* can coordinate to establish a consistent display of the web element dedicated to the second data source 114*b* as the user interacts with the web element across multiple client devices.

Figure 2A:
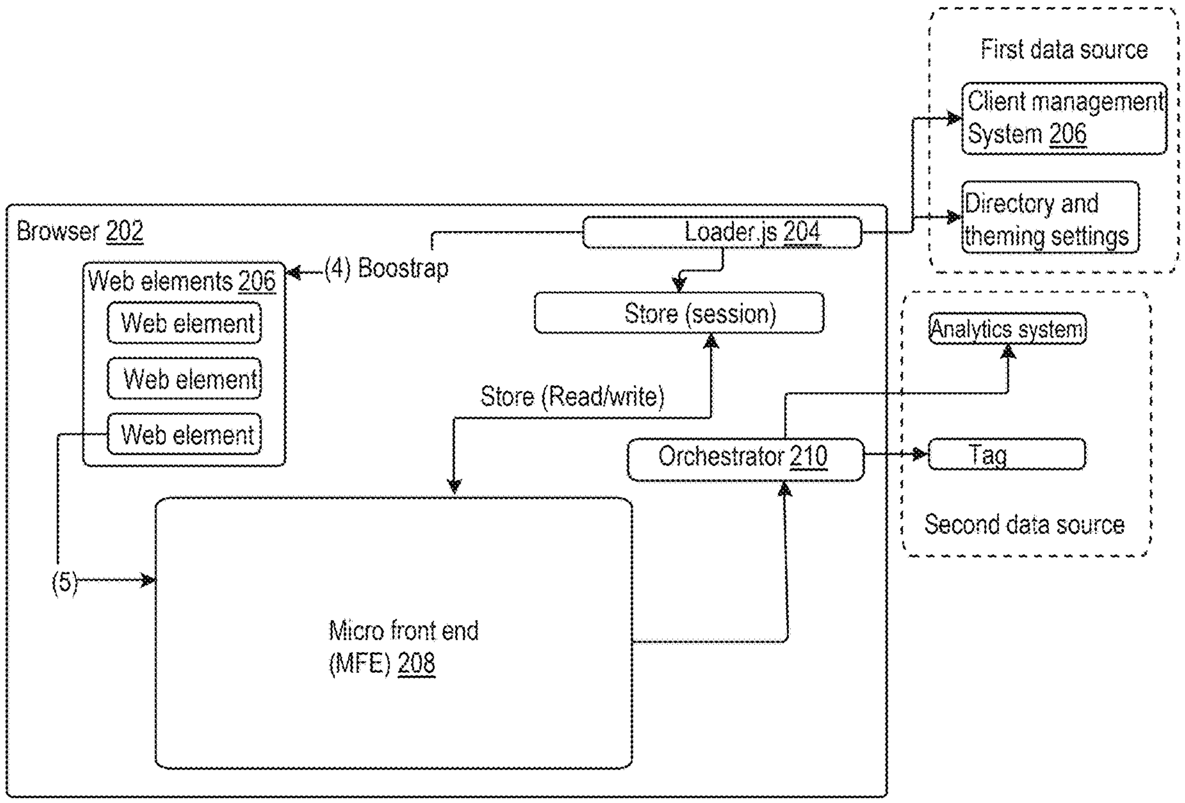
FIG. 2A shows an illustrative diagram of a system architecture for establishing a secure storage environment to reduce data interception during cyberattacks targeting unsecured environments, in accordance with one or more embodiments.

FIG. 2A shows an illustrative diagram of a system architecture 200A for establishing a secure storage environment to reduce data interception during cyberattacks targeting unsecured environments in accordance with one or more embodiments. In some embodiments, one or more of the components illustrated by the system architecture 200A can be implemented by a client device (e.g., a client device that is the same as, or similar to, the client device 102 of FIG. 1). Additionally, or alternatively, some or all of the components illustrated by the system architecture 200A can be implemented by another device working independently or in coordination with the client device, such as a first data source (e.g., a first data source that is the same as, or similar to, the first data source 114*a* of FIG. 1) and/or a second data source (e.g., a second data source that is the same as, or similar to, the second data source 114*b* of FIG. 1).

In some embodiments, a browser 202 can include a bootloader 204 ("Loader.js") that is configured to communicate with a client management system. The client management system can include instructions that are obtained by the bootloader 204 to cause the bootloader 204 to configure one or more web elements ("widgets"). In this example, the bootloader 204 can initialize and set up the parameters or settings for one or more web elements (e.g., that are the same as, or similar to, the web elements 110 of FIG. 1) when the webpage loads. This process can involve integrating JavaScript libraries or frameworks, applying specific configurations, and ensuring that the web elements behave as intended within the context of the web client implemented by the browser 202. As a result, the browser 202 can be configured to implement centralized session management and allow for seamless continuity of customer sessions across different pages and/or web elements on the webpage of an organization's website, providing secure session(s) that are accessible only to the web elements 206 that are selected and experiences powered by the web elements 206.

In some embodiments, an organization (e.g., that is the same as, or similar to, those described with respect to the first data source 114*a* of FIG. 1) chooses web element types and branding preferences when configuring the system architecture 200A. A unique identifier can be generated for the organization (e.g., that is associated with the webpage of the organization), and scripts can be shared with the organization, which then requests the service provider (e.g., a web provider) include the scripts on their website. In some embodiments, the bootloader 204 can execute scripts to scan the organization's website document object model (DOM) to identify placeholders or areas where web elements need to be configured (e.g., injected). In some embodiments, the bootloader 204 can execute a loader script and initialize a web element associated with a second data source (e.g., a second data source that is the same as, or similar to, the second data source 114*b* of FIG. 1). The web element associated with the second data source can be configured by executing a bootstrap process, which dynamically integrates the web elements 206 with corresponding event handlers or triggers, ensuring seamless interaction within the application environment. The web elements can then be loaded within inline frames and/or modal windows of the website, maintaining separation between the core website functionality and the inline frames and/or modal windows.

In some embodiments, the web elements 206 can securely store user (e.g., buyer) context and identifiers (e.g., preferences, identifiers related to vehicle choices, dealer context captured to personalize the web element behavior and enhance the user experience, context based on (e.g., including) sensitive information like product or vehicle identifiers (e.g., VINs) used for personalization, etc.). For example, the web elements 206 can obtain and store application data based on interactions between a user and a client device as described herein. In this example, the web elements 206 can determine and include identifiers indicating the preferences, choices, etc., determined and/or tracked by the web elements 206 during interactions with the user. And in response to the user providing input to a client device to terminate a session and start a new session, the browser 202 can reconfigure the web elements 206 in accordance with the application data to establish continuity when the user navigates to webpages where configured to implement the web elements as described herein. The web elements 206 can also exhibit dynamic behavior based on customer interactions, adjusting according to session context and previous engagements.

In some embodiments, the web elements can be configured (e.g., tagged) with information such as product identifiers, button interactions, lead identifiers, and vehicle identifiers (VINs). These tags can be included in the application data generated by the MFE 208 and used for analytics, tracking, and event propagation. In some embodiments, the web elements can interact in response to the MFE 208, determining trigger events that are tracked and analyzed to improve the user experience as well as optimize lead generation.

In some embodiments, the MFE 208 can communicate with an orchestrator 210 that coordinates the interaction between the MFE 208 and the second data source. The orchestrator 210 can execute operations to implement service discovery, request routing, workflow orchestration, and event management, ensuring seamless operation, efficient resource utilization, and automatic scaling. The orchestrator 210 can establish a secure communication connection with the second data source to provide application data generated as a result of interactions between a user of a client device and the web elements 206 assigned to the second data source. The second data source can then obtain the application data generated by the web elements and apply one or more tags to the application data. Additionally, or alternatively, the second data source can provide the application data (or portions thereof) to an analytics system (e.g., Google® Analytics 4 (GA4) system) to allow the organization to track user interactions on their websites in real time. The organizations can then obtain detailed insights into how users engage with the web elements, allowing for better tracking of performance metrics and understanding customer behavior.

Figure 2B:
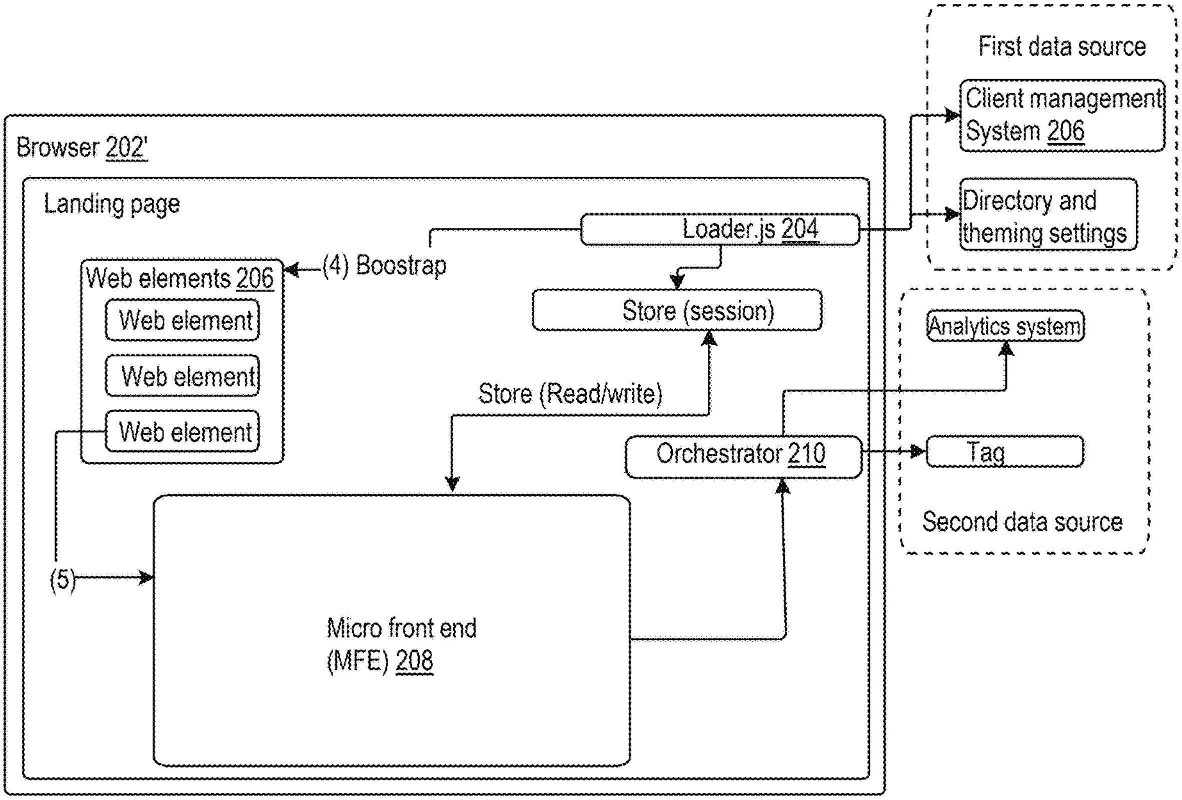
FIG. 2B shows an illustrative diagram of a system architecture for establishing a secure storage environment to reduce data interception during cyberattacks targeting unsecured environments, in accordance with one or more embodiments.

FIG. 2B shows an illustrative diagram of a system architecture 200B for establishing a secure storage environment to reduce data interception during cyberattacks targeting unsecured environments in accordance with one or more embodiments. In some embodiments, one or more of the components of the system architecture 200B can be the same as, or similar to, the system architecture 200A of FIG. 2A. As will be understood, like reference numerals can identify components that are the same as, or similar to, one another when described herein.

In some embodiments, the browser 200' can be associated with a deep link including a uniform resource locator (URL) that navigates directly to a specific location within a website or app, enhancing user the experience by bypassing intermediary pages. In some embodiments, the deep link can include a direct link to internal content. In others, the deep link can include a custom URL scheme or universal/app links to open specific app content or default to a web page if the app isn't installed. The browser 200' can also be associated with a landing page in web contexts, which is a standalone web page, distinct from the main site, crafted for a specific purpose such as capturing leads, promoting a product, or facilitating direct interactions between the user and an organization associated with the website.

Figure 2C:
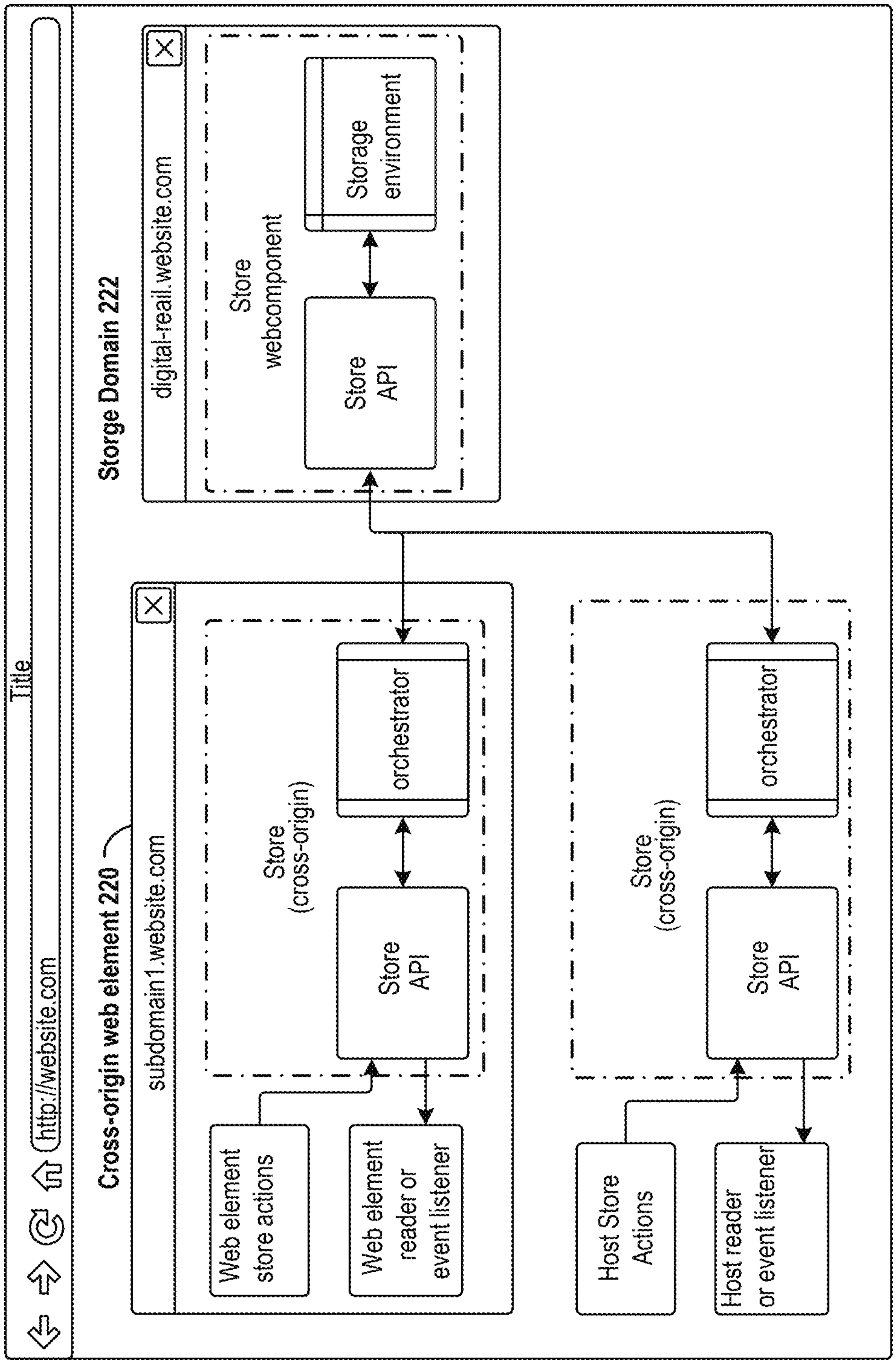
FIG. 2C shows an illustrative diagram of a web application workflow, in accordance with one or more embodiments.

FIG. 2C shows an illustrative diagram of a web application workflow 200C, in accordance with one or more embodiments. The web application workflow 200*c* can be implemented by a client device that is the same as or similar to the client device 102 of FIG. 1 and/or any other device that implements the architecture 200, 200' of FIGS. 2A and 2B. In some embodiments, the web application workflow 200C can include a cross-origin web element 220 and a storage domain 222. As described herein, the cross-origin web element 220 can be configured to establish a communication connection with the storage domain 222 and store application data generated by a user interacting with one or more web elements as described herein. In some embodiments, the cross-origin web element can execute one or more operations that are the same as, or similar to, those described above with respect to the web element associated with the second data source 114*b*, described above.

In some embodiments, the cross-origin web element 220 can be associated with a subdomain "subdomain1.website.com" and can include a web component or interactive element that operates within a webpage sourced from a different domain (e.g., a domain associated with the second data source 114*b* of FIG. 1) than the host webpage itself, functioning under the rules of Cross-Origin Resource Sharing (CORS). This can allow for the integration of third-party functionalities like buttons, comment web elements, or payment interfaces directly into a website. These web elements can navigate the browser's same-origin policy through specific permissions like CORS headers or utilize iframes for encapsulation, ensuring security and functionality. While they enhance user interaction by providing seamless access to external services, developers can additionally configure the cross-origin web element 220 to address security concerns, manage performance impacts due to cross-domain requests, and ensure compatibility across different browsers. The cross-origin web element 220 can implement one or more modules, including a web element store actions module (allowing for communication between the cross-origin web element and one or more storage environments as described herein) that allows for functionalities or operations that can be performed within a web element management system or a marketplace for web elements, which can include small, self-contained applications or components that can be embedded into larger systems, like dashboards or webpages. The cross-origin web element 220 can also include web element readers or event listeners that implement functions or objects that are registered to respond to specific events happening within a program, particularly in the context of user interfaces or web applications. The web element store and the web element reader or event listener can be configured to store and/or manage application data generated in response to user input as described herein that is stored in one or more storage environments using a store application programming interface (API). The store API can further communicate with an orchestrator to store the application data at a storage domain (e.g., the second data source). As illustrated in FIG. 2C, the storage domain can be assigned a unique identifier "digital-reail.website.com" that can be resolved as the orchestrator establishes a secure communication connection with the storage domain to save and/or update the application data. As the orchestrator of the cross-origin web element obtains application data, the orchestrator can provide the application data to the storage domain 222 using the store API and store the application data in a storage environment that is established for a given session.

In some embodiments, the web application workflow 200C can include a host store actions module to manage data generated in response to user input provided directly to one or more elements of the website. The host store and the host reader or event listener can be configured to store and/or manage application data described herein that is stored in one or more storage environments using a store application programming interface (API) provided as direct input to the website. The store API can further communicate with an orchestrator to store the application data at a storage domain (e.g., the second data source). The store for the website can also include an API that is configured to obtain the application data generated as the user interacts with the website and provide the application data to the storage environment of the storage domain 222, similar to the cross-origin web element 220.

Figure 3:
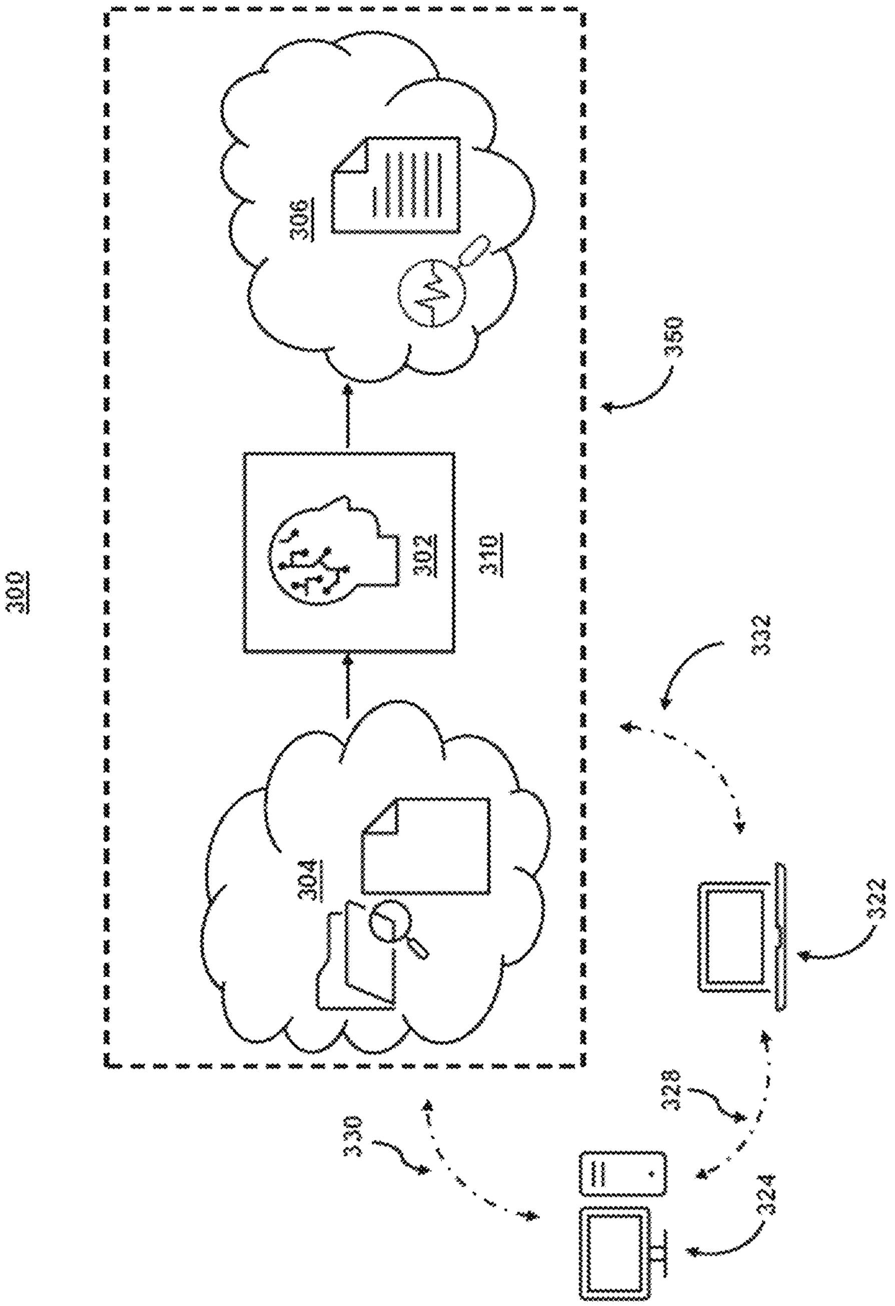
FIG. 3 shows illustrative components for a system used to establish a secure storage environment to reduce data interception during cyberattacks targeting unsecured environments, in accordance with one or more embodiments.

FIG. 3 shows illustrative components for a system used to establish a secure storage environment to reduce data interception during cyberattacks targeting unsecured environments, in accordance with one or more embodiments. As shown in FIG. 3, system 300 can include mobile device 322 and user terminal 324. While shown as a smartphone and personal computer, respectively, in FIG. 3, it should be noted that mobile device 322 and user terminal 324 can be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 can alternatively be any computing device as described above and can include any type of mobile terminal, fixed terminal, or other device. For example, cloud components 310 can be implemented as a cloud computing system and can feature one or more component devices. It should also be noted that system 300 is not limited to three devices. Users can, for instance, utilize one or more devices to interact with one another, one or more servers, or other components of system 300. It should be noted that, while one or more operations are described herein as being performed by particular components of system 300, these operations can, in some embodiments, be performed by other components of system 300. As an example, while one or more operations are described herein as being performed by components of mobile device 322, these operations can, in some embodiments, be performed by components of cloud components 310. In some embodiments, the various computers and systems described herein can include one or more computing devices that are programmed to perform the described functions. Additionally, or alternatively, multiple users can interact with system 300 and/or one or more components of system 300. For example, in one embodiment, a first user and a second user can interact with system 300 using two different components.

With respect to the components of mobile device 322, user terminal 324, and cloud components 310, each of these devices can receive content and data via input/output (hereinafter "I/O") paths. Each of these devices can also include processors and/or control circuitry to send and receive commands, requests, and other suitable data using the I/O paths. The control circuitry can comprise any suitable processing, storage, and/or input/output circuitry. Each of these devices can also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices can have neither user input interfaces nor displays and can instead receive and display content using another device (e.g., a dedicated display device such as a computer screen and/or a dedicated input device such as a remote control, mouse, voice input, etc.). Additionally, the devices in system 300 can run an application (or another suitable program). The application can cause the processors and/or control circuitry to perform operations related to generating dynamic conversational replies, queries, and/or notifications.

Each of these devices can also include electronic storages. The electronic storages can include non-transitory storage media that electronically store information. The electronic storage media of the electronic storages can include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages can include one or more virtual storage resources (e.g., cloud storage, a virtual private network, and/or other virtual storage resources). The electronic storages can store software algorithms, information determined by the processors, information obtained from servers, information obtained from client devices, or other information that enables the functionality as described herein.

FIG. 3 also includes communication paths 328, 330, and 332. Communication paths 328, 330, and 332 can include the Internet, a mobile phone network, a mobile voice or data network (e.g., a 5G or LTE network), a cable network, a public switched telephone network, or other types of communications networks or combinations of communications networks. Communication paths 328, 330, and 332 can separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices can include additional communication paths linking a plurality of hardware, software, and/or firmware components operating together. For example, the computing devices can be implemented by a cloud of computing platforms operating together as the computing devices.

Cloud components 310 can include model 302, which can be a machine learning model, an artificial intelligence model, etc. (which can be referred to collectively as "models" herein). Model 302 can take inputs 304 and provide outputs 306. The inputs can include multiple datasets, such as a training dataset and a test dataset. Each of the plurality of datasets (e.g., inputs 304) can include data subsets related to user data, predicted forecasts and/or errors, and/or actual forecasts and/or errors. In some embodiments, outputs 306 can be fed back to model 302 as input to train the model 302 (e.g., alone or in conjunction with user indications of the accuracy of outputs 306, labels associated with the inputs, or with other reference feedback information). For example, the system can receive a first labeled feature input, wherein the first labeled feature input is labeled with a known prediction for the first labeled feature input. The system can then train the first machine learning model to classify the first labeled feature input with the known prediction (e.g., an action graph, a graph characteristic, a graph value, an objective, etc.).

In a variety of embodiments, model 302 can update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights can be adjusted to reconcile differences between the neural network's prediction and reference feedback. In a further use case, one or more neurons (or nodes) of the neural network can require that their respective errors be sent backward through the neural network to facilitate the update process (e.g., backpropagation of error). Updates to the connection weights can, for example, be reflective of the magnitude of error propagated backward after a forward pass has been completed. In this way, for example, the model 302 can be trained to generate better predictions.

In some embodiments, model 302 can include an artificial neural network. In such embodiments, model 302 can include an input layer and one or more hidden layers. Each neural unit of model 302 can be connected with many other neural units of model 302. Such connections can be enforcing or inhibitory in their effect on the activation state of connected neural units. In some embodiments, each individual neural unit can have a summation function that combines the values of all of its inputs. In some embodiments, each connection (or the neural unit itself) can have a threshold function such that the signal must surpass it before it propagates to other neural units. Model 302 can be self-learning and trained, rather than explicitly programmed, and can perform significantly better in certain areas of problem solving as compared to traditional computer programs. During training, an output layer of model 302 can correspond to a classification of model 302, and an input known to correspond to that classification can be input into an input layer of model 302 during training. During testing, an input without a known classification can be input into the input layer, and a determined classification can be output.

In some embodiments, model 302 can include multiple layers (e.g., where a signal path traverses from front layers to back layers). In some embodiments, back propagation techniques can be utilized by model 302, where forward stimulation is used to reset weights on the "front" neural units. In some embodiments, stimulation and inhibition for model 302 can be more free-flowing, with connections interacting in a more chaotic and complex fashion. During testing, an output layer of model 302 can indicate whether or not a given input corresponds to a classification of model 302 (e.g., an action graph, a graph characteristic, a graph value, an objective, etc.).

In some embodiments, the model (e.g., model 302) can automatically perform actions based on outputs 306. In some embodiments, the model (e.g., model 302) can not perform any actions. The output of the model (e.g., model 302) can be used to generate a response in a user interface.

System 300 also includes API layer 350. API layer 350 can allow the system to generate summaries across different devices. In some embodiments, API layer 350 can be implemented on mobile device 322 or user terminal 324. Alternatively or additionally, API layer 350 can reside on one or more of cloud components 310. API layer 350 (which can be a REST or Web services API layer) can provide a decoupled interface to data and/or functionality of one or more applications. API layer 350 can provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services as well as for exchanging information with partners in B2B transactions.

API layer 350 can use various architectural arrangements. For example, system 300 can be partially based on API layer 350, such that there is strong adoption of SOAP and RESTful Web services, using resources like Service Repository and Developer Portal, but with low governance, standardization, and separation of concerns. Alternatively, system 300 can be fully based on API layer 350, such that separation of concerns between layers like API layer 350, services, and applications are in place.

In some embodiments, the system architecture can use a microservice approach. Such systems can use two types of layers: Front-End Layer and Back-End Layer, where microservices reside. In this kind of architecture, the role of the API layer 350 can provide integration between Front-End and Back-End. In such cases, API layer 350 can use RESTful APIs (exposition to front-end or even communication between microservices). API layer 350 can use AMQP (e.g., Kafka, RabbitMQ, etc.). API layer 350 can use incipient usage of new communications protocols such as gRPC, Thrift, etc.

In some embodiments, the system architecture can use an open API approach. In such cases, API layer 350 can use commercial or open-source API Platforms and their modules. API layer 350 can use a developer portal. API layer 350 can use strong security constraints by applying WAF and DDoS protection, and API layer 350 can use RESTful APIs as standard for external integration.

Figure 4:
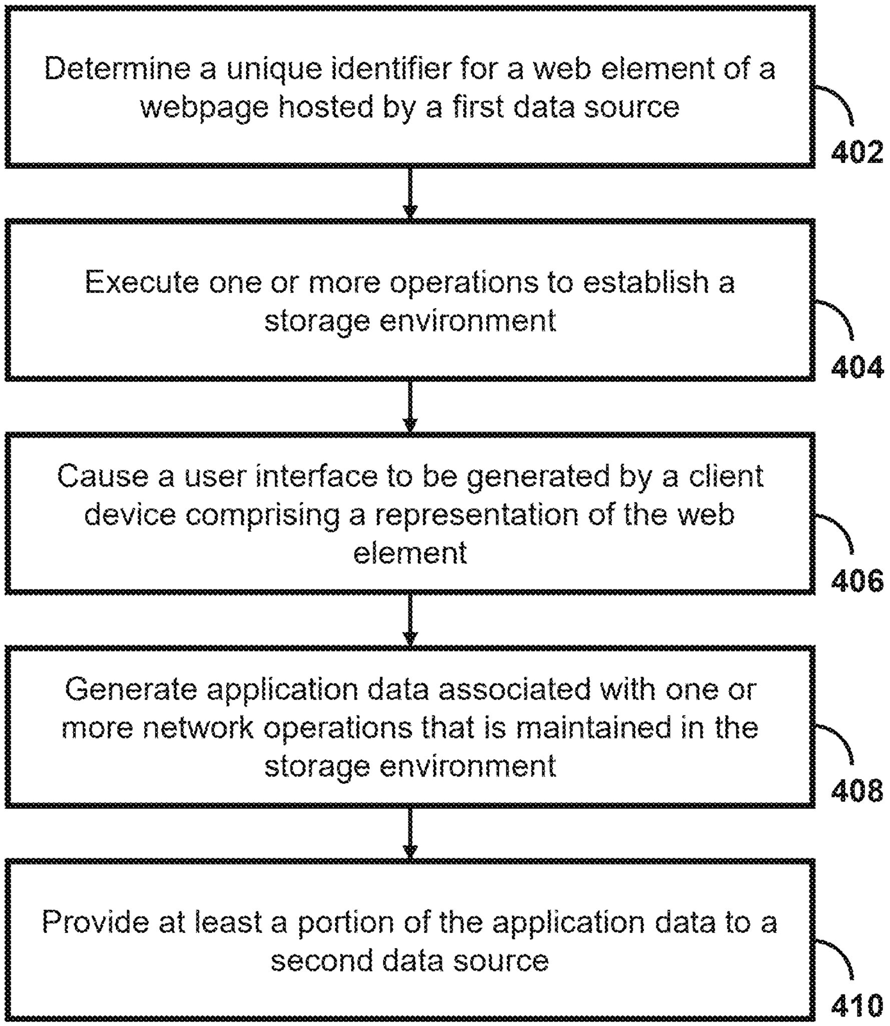
FIG. 4 shows a flowchart of the steps involved in a process for establishing a secure storage environment to reduce data interception during cyberattacks targeting unsecured environments, in accordance with one or more embodiments.

FIG. 4 shows a flowchart of the steps involved in a process 400 for establishing a secure storage environment to reduce data interception during cyberattacks targeting unsecured environments in accordance with one or more embodiments. For example, a system that is the same as (or similar to) the client device 102 of FIG. 1 (or one or more components thereof) can implement process 400.

At operation 402, the process 400 can include determining a unique identifier for a web element of a webpage hosted by a first data source. For example, a web client implemented by a client device can obtain webpage data from a first data source in response to receiving user input indicating a request to display a user interface (UI) of a website on a display device of the client device. The web client can then determine a unique identifier for a web element that is associated with (e.g., injected into) the website, the unique identifier identifying a second data source maintaining data associated with the web element. In some embodiments, the data maintained by the second data source can include web element data that is configured to cause the portion of the UI corresponding to the web element (e.g., an inline frame, a modal window, etc.) to be displayed when the UI for the website is displayed. In embodiments, the data maintained by the second data source can include application data that is generated based on user input provided by the user controlling the client device.

At operation 404, the process 400 can include executing one or more operations to establish a storage environment. For example, the client device can use the webpage data to configure an MFE that subsequently configures one or more web elements (widgets) and a database during a session. When configuring the database, the MFE can establish a first storage environment and a second storage environment (e.g., a secured storage environment). The second storage environment can be configured to maintain application data generated based on user input to the web element corresponding to a data source (referred to in FIG. 1 as a second data source) that is secured and separate from a data source (referred to in FIG. 1 as a first data source) that hosts the webpage data used to generate the UI at the client device representing the webpage.

At operation 406, the process 400 can include causing a UI to be generated by a client comprising a representation of the web element. For example, in response to receiving user input identifying a webpage, a web client can cause a UI to be generated, where the UI represents the website. The UI can also have a portion dedicated to one or more web elements that can be configured to receive user input and generate application data.

At operation 408, the process 400 can include generating application data associated with one or more network operations that is maintained in the storage environment. As user input is received, the web client can generate application data and store the application data in the second storage environment. In some embodiments, the web client can also encrypt the application data and iteratively update the application data in response to additional user input at the client device. In some embodiments, the user input can be configured to initiate one or more network operations. For example, where the web element is associated with an inline frame or a modal window embedded in a website to initiate pre-approvals for purchases, the application data can be generated and include data associated with one or more network operations. The data associated with the one or more network operations can be indicative of a state of the one or more network operations (e.g., whether additional information is needed, whether the pre-approval is complete or not complete, a value associated with the pre-approval, etc.).

At operation 410, the process 400 can include providing at least a portion of the application data to a second data source. For example, the MFE can be configured to establish a secured communication connection with the second data source and either periodically or continuously update (e.g., mirror) the application data maintained in the second storage environment at the second data source. This process can be iteratively repeated as the user causes the web client to navigate to one or more websites that indicate the web element associated with the second data source.

Some embodiments of the present disclosure are described in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The above-described embodiments of the present disclosure are presented for purposes of illustration and not of limitation, and the present disclosure is limited only by the claims that follow. Furthermore, it should be noted that the features and limitations described in any one embodiment can be applied to any embodiment herein, and flowcharts or examples relating to one embodiment can be combined with any other embodiment in a suitable manner, done in different orders, or done in parallel. In addition, the systems and methods described herein can be performed in real time. It should also be noted that the systems and/or methods described above can be applied to, or used in accordance with, other systems and/or methods.

The present techniques will be better understood with reference to the following enumerated embodiments:

1. Methods for establishing a secure storage environment to reduce data interception during cyberattacks targeting unsecured environments.
2. The method of any one of the preceding embodiments, further comprising: determining a unique identifier for a web element of plurality of web elements of a webpage hosted by a first data source that identifies a second data source maintaining data associated with the web element; in response to determining the unique identifier for the web element, executing one or more operations to establish a storage environment that is segmented from one or more other storage environments maintained at a client device for the webpage; causing a user interface (UI) to be generated by a display device of the client device, the UI comprising a representation of the web element; in response to receiving user input at the client device in accordance with the web element, generating application data associated with one or more network operations that is maintained in the storage environment; and in response to generating the application data, providing at least a portion of the application data to the second data source.
3. The method of any one of the preceding embodiments, further comprising: obtaining, in accordance with a browsing context, user input indicating a request to display the UI for the webpage hosted by the first data source; obtaining webpage data from the first data source indicating the plurality of web elements to be displayed based on the request; and determining the unique identifier for the web element of the plurality of web elements based on the webpage data.
4. The method of any one of the preceding embodiments, further comprising: in response to receiving webpage data from the first data source, assigning access to the storage environment to a web client; and configuring the web client to establish a secure communication connection between the storage environment and the second data source; and wherein providing at least a portion of the application data to the second data source comprises: providing, via the web client, at least a portion of the application data to the second data source in accordance with the secure communication connection.
5. The method of any one of the preceding embodiments, further comprising: determining the unique identifier for the web element of a plurality of web elements based on the webpage data; and configuring the web client to: obtain web element data from the second data source based on the unique identifier for the web element; and generate the UI based on the webpage data and the web element data.
6. The method of any one of the preceding embodiments, further comprising: in response to generation of the application data, encrypting at least a portion of the application data in accordance with a protocol established by the secure communication connection; and wherein providing at least a portion of the application data to the second data source comprises: providing at least a portion of the application data to the second data source in response to encrypting at least a portion of the application data.
7. The method of any one of the preceding embodiments, wherein the browsing context comprises a first browsing context, the method further comprising: obtaining, in accordance with a second browsing context, second user input indicating a second request to display a second user interface for a second webpage hosted by a third data source that is unsecured; obtaining second webpage data from the third data source indicating a second plurality of web elements to be displayed based on the second request, the second plurality of web elements comprising the web element; and causing a second UI to be generated by the display device of the client device based on the second webpage data.
8. The method of any one of the preceding embodiments where the browsing context comprises a first browsing context and where the webpage comprises a first webpage, the method further comprising: determining that a first session corresponding to the first browsing context is terminated; obtaining, in accordance with a second browsing context and during a second session, second user input indicating a second request to display a second UI for the first webpage hosted by the first data source that is unsecured; obtaining second webpage data from the first data source indicating the plurality of web elements to be displayed based on the second request; and causing a second UI to be generated by the display device of the client device based on the second webpage data, the second UI comprising the representation of the web element.

9. The method of any one of the preceding embodiments, where the browsing context comprises a first browsing context, further comprising: determining that a first session corresponding to the first browsing context is terminated; obtaining, in accordance with a second browsing context and during a second session, second user input indicating a second request to display a second user interface for a second webpage hosted by a third data source that is unsecured; obtaining second webpage data from the third data source indicating a second plurality of web elements to be displayed based on the second request, the second plurality of web elements comprising the web element; and causing a second UI to be generated by the display device of the client device based on the second webpage data 10. The method of any one of the preceding embodiments, where causing the UI to be generated comprises: causing the UI to be generated, where the web element is associated with a portion of the UI dedicated to the web element; and wherein generating the application data associated with the one or more network operations comprises: determining that the user input at the client device is received at a location of the UI dedicated to the web element, and in response to determining that the user input is received at the location of the UI dedicated to the web element, generating the application data based on the user input to be maintained in the storage environment.

11. The method of any one of the preceding embodiments, where the user input comprises first user input, the method further comprising: receiving second user input indicating selection of one or more second web elements that are different from the web element; updating the application data in the storage environment based on the selection of the one or more second web elements; and wherein providing at least a portion of the application data to the second data source comprises: in response to updating the application data, providing at least a portion of the application data to the second data source.

12. The method of any one of the preceding embodiments, further comprising: in response to receiving the application data at the second data source, extracting session information from the application data; determining an identifier associated with the first data source based on the session information; and providing at least a portion of the session information to the second data source to cause the second data source to generate an updated webpage.

13. The method of any one of the preceding embodiments, where the user input comprises first user input received at a first client device, the method further comprising: obtaining, in accordance with a second browsing context displayed at a second client device, second user input indicating a second request to display a second user interface for a second webpage; determining a user identifier corresponding to the second user input based on the second request to display the second user interface; obtaining second webpage data from a third data source indicating a second plurality of web elements to be displayed based on the second request and the user identifier, the second plurality of web elements comprising the web element; and causing a second UI to be generated by the display device of the client device based on the second webpage data.

14. The method of any one of the preceding embodiments, further comprising: in response to obtaining the second webpage data, determining the unique identifier for the web element based on the second webpage data; obtaining web element data associated with the web element from the second data source based on the unique identifier for the web element; and wherein causing the second UI to be generated comprises: causing the second UI to be generated based on the web element data.

15. The method of any one of the preceding embodiments, where the web element comprises a first web element, the unique identifier for the first web element comprises a first unique identifier, and the user input received at the client device comprises first user input, the method further comprising: determining a second unique identifier for a second web element of the plurality of web elements; in response to receiving second user input at the client device in accordance with the second web element, updating the application data maintained in the storage environment; and in response to updating the application data, providing at least a portion of the application data to the second data source.

16. One or more non-transitory, computer-readable mediums storing instructions recorded thereon that, when executed by a data processing apparatus, cause the data processing apparatus to perform operations comprising those of any of embodiments 1-15.

18. A system comprising one or more processors and memory storing instructions that, when executed by the processors, cause the processors to effectuate operations comprising those of any of embodiments 1-15.

19. A system comprising means for performing any of embodiments 1-15.

What is claimed is:

1. A system for establishing a secure storage environment to reduce data interception during cyberattacks targeting unsecured environments, the system comprising:

one or more processors; and one or more non-transitory, computer-readable mediums having instructions recorded thereon that, when executed by the one or more processors, cause the one or more processors to perform operations comprising:

obtaining, in accordance with a browsing context, user input indicating a request to display a user interface (UI) for a webpage hosted by a first data source that is unsecured;

obtaining webpage data from the first data source indicating a plurality of web elements to be displayed based on the request;

determining a unique identifier for a secured web element of the plurality of web elements that identifies a second data source different from the first data source;

in response to determining the unique identifier for the secured web element, executing one or more operations to establish a secured storage environment that is segmented from one or more other storage environments maintained by the webpage;

storing secured web element data associated with the secured web element from the second data source based on the unique identifier in the secured storage environment, the secured web element data configured to cause a display device of a client device to display the secured web element in relation to the webpage hosted by the first data source;

causing the UI to be generated by the display device of the client device, the UI comprising a representation of the secured web element;

in response to receiving user input at the client device in accordance with the secured web element, generating application data associated with one or more network operations that is maintained in the secured storage environment; and in response to generating the application data, providing at least a portion of the application data corresponding to at least a portion of the one or more network operations in the secured storage environment to the second data source in accordance with one or more security protocols, wherein at least a portion of session information extracted from the application data is used at the second data source to generate an updated webpage.

2. A method implemented using a computing system comprising one or more processors, the method comprising:

determining a unique identifier for a web element of a plurality of web elements of a webpage hosted by a first data source that identifies a second data source maintaining data associated with the web element, the second data source being different from the first data source;

in response to determining the unique identifier for the web element, executing one or more operations to establish a secured storage environment that is segmented from one or more other storage environments maintained at a client device for the webpage;

causing a user interface (UI) to be generated by a display device of the client device, the UI comprising a representation of the web element;

in response to receiving user input at the client device in accordance with the web element, generating application data associated with one or more network operations that is maintained in the secured storage environment; and in response to generating the application data, providing at least a portion of the application data corresponding to at least a portion of the one or more network operations in the secured storage environment to the second data source in accordance with one or more security protocols, wherein at least a portion of session information extracted from the application data is used at the second data source to generate an updated webpage.

3. The method of claim 2, further comprising:

obtaining, in accordance with a browsing context, at least one user input indicating a request to display the UI for the webpage hosted by the first data source;

obtaining webpage data from the first data source indicating the plurality of web elements to be displayed based on the request; and determining the unique identifier for the web element of the plurality of web elements based on the webpage data.

4. The method of claim 2, further comprising:

in response to receiving webpage data from the first data source, assigning access to the secured storage environment to a web client; and configuring the web client to establish a secure communication connection between the secured storage environment and the second data source; and wherein providing at least a portion of the application data to the second data source comprises:

providing, via the web client, at least a portion of the application data to the second data source in accordance with the secure communication connection.

5. The method of claim 4, further comprising:

determining the unique identifier for the web element of plurality of web elements based on the webpage data; and configuring the web client to:

obtain web element data from the second data source based on the unique identifier for the web element; and generate the UI based on the webpage data and the web element data.

6. The method of claim 4, further comprising:

in response to the generation of the application data, encrypting at least a portion of the application data in accordance with a protocol established by the secure communication connection; and wherein providing at least a portion of the application data to the second data source comprises:

providing at least a portion of the application data to the second data source in response to encrypting at least a portion of the application data.

7. The method of claim 3, wherein the browsing context comprises a first browsing context; the method further comprising:

obtaining, in accordance with a second browsing context, second user input indicating a second request to display a second user interface for a second webpage hosted by a third data source that is unsecured;

obtaining second webpage data from the third data source indicating a second plurality of web elements to be displayed based on the second request, the second plurality of web elements comprising the web element; and causing a second UI to be generated by the display device of the client device based on the second webpage data.

8. The method of claim 3, where the browsing context comprises a first browsing context and where the webpage comprises a first webpage, the method further comprising:

determining that a first session corresponding to the first browsing context is terminated;

obtaining, in accordance with a second browsing context and during a second session, second user input indicating a second request to display a second UI for the first webpage hosted by the first data source that is unsecured;

obtaining second webpage data from the first data source indicating the plurality of web elements to be displayed based on the second request; and causing the second UI to be generated by the display device of the client device based on the second webpage data, the second UI comprising the representation of the web element.

9. The method of claim 3, wherein the browsing context comprises a first browsing context; the method further comprising:

determining that a first session corresponding to the first browsing context is terminated;

obtaining, in accordance with a second browsing context and during a second session, second user input indicating a second request to display a second user interface for a second webpage hosted by a third data source that is unsecured;

obtaining second webpage data from the third data source indicating a second plurality of web elements to be displayed based on the second request, the second plurality of web elements comprising the web element; and causing a second UI to be generated by the display device of the client device based on the second webpage data.

10. The method of claim 2, wherein causing the UI to be generated comprises:

causing the UI to be generated, where the web element is associated with a portion of the UI dedicated to the web element; and wherein generating the application data associated with the one or more network operations comprises:

determining that the user input at the client device is received at a location of the UI dedicated to the web element, and in response to determining that the user input is received at the location of the UI dedicated to the web element, generating the application data based on the user input to be maintained in the secured storage environment.

11. The method of claim 2, wherein the user input comprises first user input, the method further comprising:

receiving second user input indicating selection of one or more second web elements that are different from the web element;

updating the application data in the secured storage environment based on the selection of the one or more second web elements; and wherein providing at least a portion of the application data to the second data source comprises:

in response to updating the application data, providing at least a portion of the application data to the second data source.

12. The method of claim 2, wherein the user input comprises first user input received at a first client device, the method further comprising:

obtaining, in accordance with a second browsing context displayed at a second client device, second user input indicating a second request to display a second user interface for a second webpage;

determining a user identifier corresponding to the second user input based on the second request to display the second user interface;

obtaining second webpage data from a third data source indicating a second plurality of web elements to be displayed based on the second request and the user identifier, the second plurality of web elements comprising the web element; and causing a second UI to be generated by the display device of the client device based on the second webpage data.

13. The method of claim 12, further comprising:

in response to obtaining the second webpage data, determining the unique identifier for the web element based on the second webpage data;

obtaining web element data associated with the web element from the second data source based on the unique identifier for the web element; and wherein causing the second UI to be generated comprises: causing the second UI to be generated based on the web element data.

14. The method of claim 2, wherein the web element comprises a first web element, the unique identifier for the first web element comprises a first unique identifier, and the user input received at the client device comprises first user input; the method further comprising:

determining a second unique identifier for a second web element of the plurality of web elements;

in response to receiving second user input at the client device in accordance with the second web element, updating the application data maintained in the secured storage environment; and in response to updating the application data, providing at least a portion of the application data to the second data source.

15. One or more non-transitory, computer-readable mediums comprising instructions that, when executed by one or more processors, cause the one or more processors to perform operations comprising:

determining a unique identifier for a web element of a plurality of web elements of a webpage hosted by a first data source that identifies a second data source maintaining data associated with the web element, the second data source being different from the first data source;

in response to determining the unique identifier for the web element, executing one or more operations to establish a secured storage environment that is segmented from one or more other storage environments maintained at a client device for the webpage;

causing a user interface (UI) to be generated by a display device of the client device, the UI comprising a representation of the web element;

in response to receiving user input at the client device in accordance with the web element, generating application data associated with one or more network operations that is maintained in the secured storage environment; and in response to generating the application data, providing at least a portion of the application data corresponding to at least a portion of the one or more network operations in the secured storage environment to the second data source in accordance with one or more security protocols, wherein at least a portion of session information extracted from the application data is used at the second data source to generate an updated webpage.

16. The one or more non-transitory, computer-readable mediums of claim 15, wherein the instructions further cause the one or more processors to perform operations comprising:

obtaining, in accordance with a browsing context, at least one user input indicating a request to display the UI for the webpage hosted by the first data source;

obtaining webpage data from the first data source indicating the plurality of web elements to be displayed based on the request; and determining the unique identifier for the web element of the plurality of web elements based on the webpage data.

17. The one or more non-transitory, computer-readable mediums of claim 15, wherein the instructions further cause the one or more processors to perform operations comprising:

in response to receiving webpage data from the first data source, assigning access to the secured storage environment to a web client; and configuring the web client to establish a secure communication connection between the secured storage environment and the second data source; and wherein the instructions that cause the one or more processors to provide at least a portion of the application data to the second data source cause the one or more processors to:

provide, via the web client, at least a portion of the application data to the second data source in accordance with the secure communication connection.

18. The one or more non-transitory, computer-readable mediums of claim 17, wherein the instructions further cause the one or more processors to perform operations comprising:

determining the unique identifier for the web element of the plurality of web elements based on the webpage data; and configuring the web client to:

obtain web element data from the second data source based on the unique identifier for the web element; and generate the UI based on the webpage data and the web element data.

19. The one or more non-transitory, computer-readable mediums of claim 17, wherein the instructions further cause the one or more processors to perform operations comprising:

in response to the generation of the application data, encrypting at least a portion of the application data in accordance with a protocol established by the secure communication connection; and wherein the instructions that cause the one or more processors to provide at least a portion of the application data to the second data source cause the one or more processors to:

provide at least a portion of the application data to the second data source in response to encrypting at least a portion of the application data.

* * * * *